United States Patent [19]

Gartung

[11] 4,056,297
[45] Nov. 1, 1977

[54] REMOVABLE ELECTRICAL FIXTURES FOR MODULAR WALL PANELS

[76] Inventor: Clifford W. Gartung, Santa Ana, Calif.

[21] Appl. No.: 741,797

[22] Filed: Nov. 15, 1976

[51] Int. Cl.² ............................................. H02G 3/26
[52] U.S. Cl. ......................................... 339/23; 174/48
[58] Field of Search ............... 339/20, 21, 23; 52/220, 52/221, 242, 287, 290; 174/48, 49, 70 C, 72 C

[56] References Cited

U.S. PATENT DOCUMENTS

| 1,981,239 | 11/1934 | Manske | 52/290 |
| 2,069,967 | 2/1937 | Murray et al. | 174/72 C |
| 2,359,505 | 10/1944 | Barnes | 52/287 |
| 3,345,787 | 10/1967 | Busscher | 52/242 |

*Primary Examiner*—Roy Lake
*Assistant Examiner*—Neil Abrams

*Attorney, Agent, or Firm*—Harold Jackson; Stanley Jones; Joseph W. Price

[57] ABSTRACT

An electrical socket bearing fixture is adapted for use on a modular wall panel having a rigid peripheral support frame enclosing a decorative compressible planar wall surface. The fixture includes an electrical socket bearing member and a molding member for carrying electrical lines. The socket bearing and molding members can be removably mounted integrally with the modular wall panel without fasteners or alteration of the panel. The socket bearing member includes a mounting plate edge and tab which are inserted between the rigid frame and the compressible surface to position the socket bearing member. The molding member interlocks with the socket bearing member and also bears mounting tabs for insertion between the rigid frame and compressible wall surface material.

8 Claims, 6 Drawing Figures

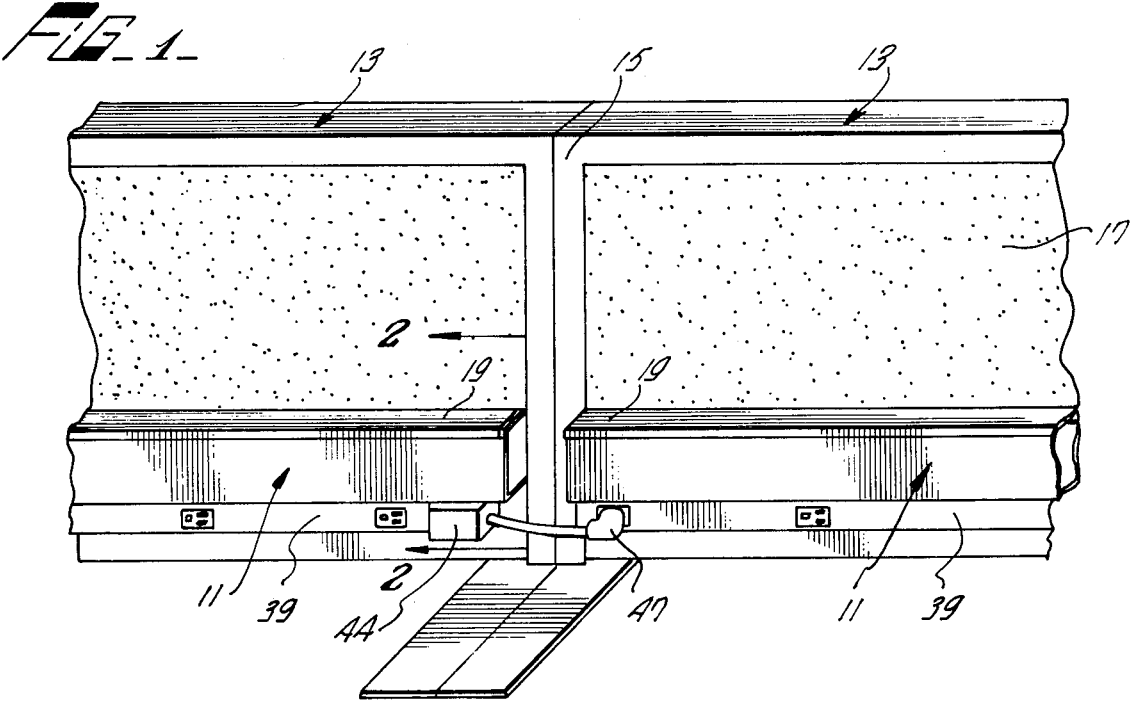
FIG_1_
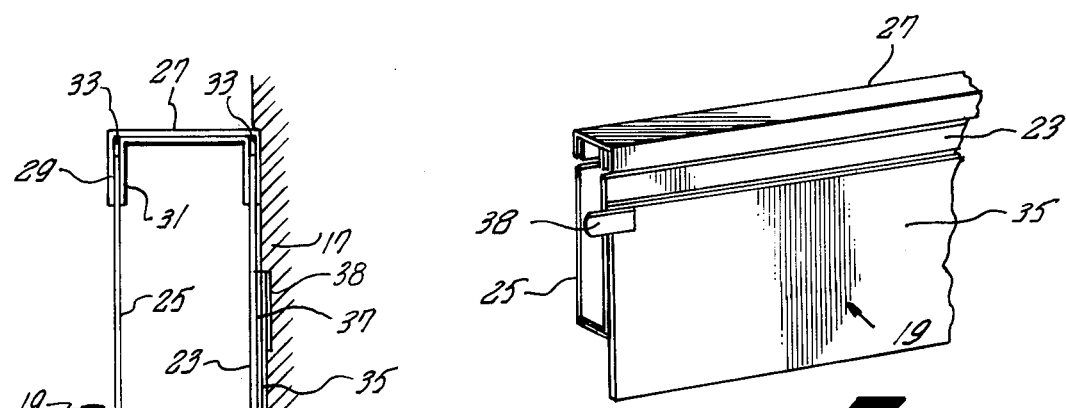
FIG_2_
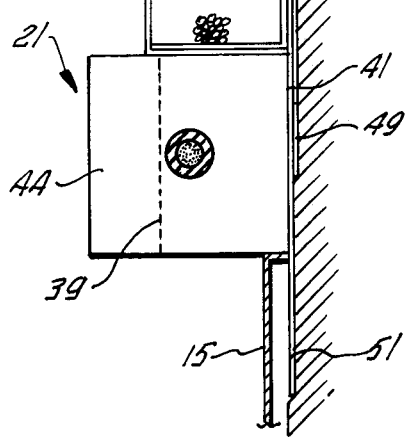
FIG_4_
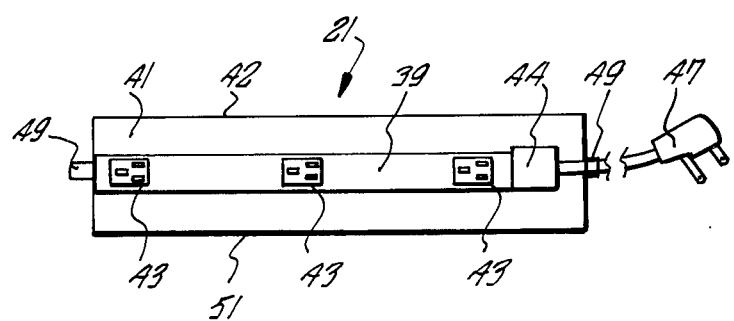
FIG_3_

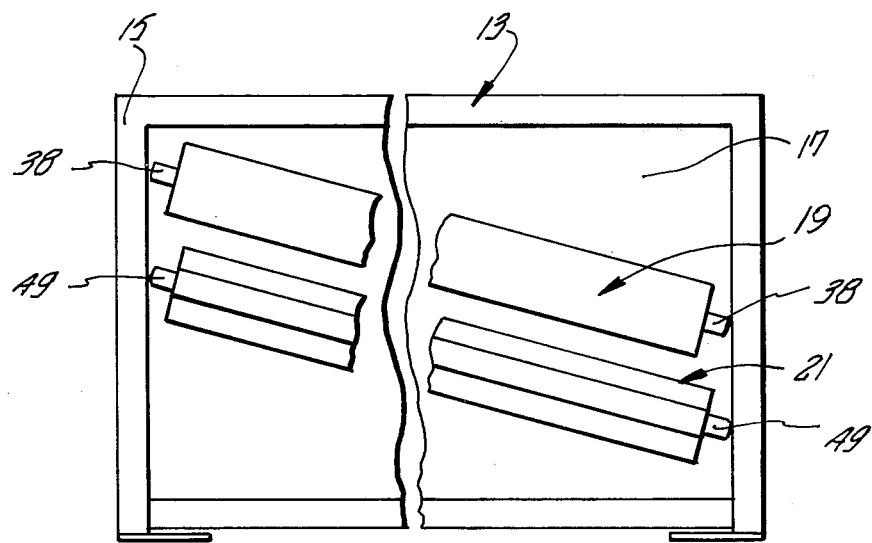
FIG. 6.
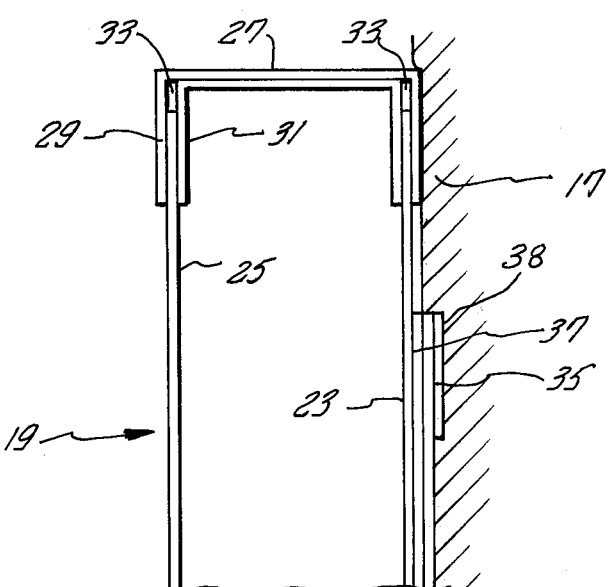
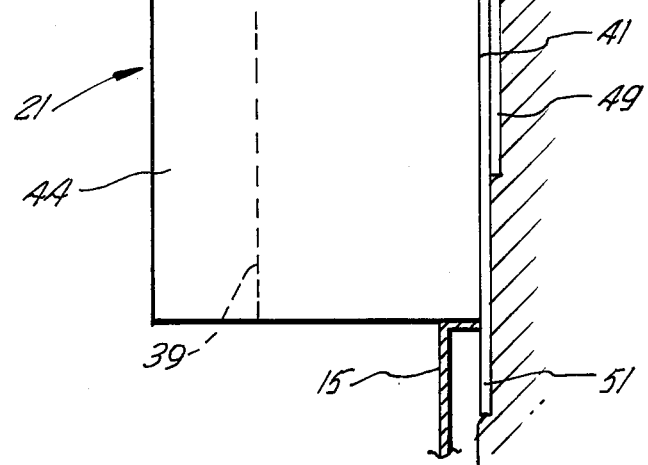
FIG. 5.

REMOVABLE ELECTRICAL FIXTURES FOR MODULAR WALL PANELS

BACKGROUND OF THE INVENTION

1. Field of the Invention

The present invention is directed to an electrical accessory for use on panel wall modules and more particularly to removable assemblies providing connection interfaces for various electrical apparatus.

2. Description of the Prior Art

Modern offices have frequently utilized removable interior wall partitions to accommodate flexible office planning. In fact, many new building structures are now designed to provide permanent load-bearing exterior walls while relying upon semi-permanent or mobile non-load bearing interior partition walls for a subjective determination of office floor plans. Frequently the mobile wall partitions include a sheet or pad of a sound absorbing material, for example a sheet of fibrous material such as glass fibers. A rigid frame structure surrounds the perimeter of the sound absorbing panel, as disclosed in the Gartung U.S. Pat. No. 3,934,382. The sound absorbing panel is capable of supporting a decorative surface but generally is not capable of supporting any additional direct weight, such as shelving, coat hangers, etc.

As can be readily appreciated, it is frequently necessary in an office environment to provide electrical outlets and telephone connections for the rooms partitioned by a modular wall panel. To date, the prior art has primarily relied upon the installation of standard junction box electrical fixtures with the attendant necessity to provide a permanent aperture in the associated wall. Another approach is to use floor-mounted junction boxes. Either approach is not entirely compatible for use with modular wall panel units where rooms are continually being reconfigured. Unnecessary electrical fixtures may be required to be retained in place in wall units to prevent leaving unsightly gaps. Floor-mounted electrical connection units may also prove to be disadvantageously located and difficult to relocate.

The prior art to date has not provided a relatively inexpensive and aesthetically pleasing form of removable electrical outlets that can be utilized with modular wall panels.

SUMMARY OF THE INVENTION

It is therefore an object of the invention to provide electrical interface apparatus which can be removably mounted on modular wall panel units without alteration or damage to the wall panels.

It is another object of the invention to provide electrical interface apparatus in a modular and aesthetically pleasing configuration.

It is another object of the invention to adapt such electrical interface apparatus for providing typical interface functions necessary to office operation such as providing electrical outlets and carrying telephone cables.

These and other objects and advantages are accomplished according to the invention by provision of a panel which carries electrical interfacing elements such as standard electrical wall sockets. This panel also bears attachment means insertable between the rigid frame and compressible surface material of a modular wall unit to hold the panel in position. According to another aspect of the invention, a hollow molding is provided which contains similar attachment means for mounting to a modular wall unit. This hollow molding is adapted to interlockingly engage with the interface element bearing panel and may carry and conceal electrical cables such as telephone wires.

BRIEF DESCRIPTION OF THE DRAWINGS

The preferred embodiment and best mode presently contemplated for practicing the just summarized invention will now be described in detail in conjuction with the drawings of which:

FIG. 1 is a perspective view illustrating two electrical interface apparatus mounting fixtures of the preferred embodiment of the invention mounted in place on adjacent modular wall panel units.

FIG. 2 is a sectional view taken at 2—2 in FIG. 1 illustrating a cross-section of the electrical apparatus mounting fixture of the preferred embodiment and its cooperation with a wall panel unit.

FIG. 3 is a front view of the socket bearing plate of the preferred embodiment of the invention.

FIG. 4 is a perspective view of a molding member according to the preferred embodiment.

FIG. 5 is an enlarged view of the section of FIG. 2 more particularly illustrating the cooperation of the mounting fixtures and a wall panel unit.

FIG. 6 is a front view illustrating the mounting of a molding member and socket bearing plate according to the preferred embodiment.

DETAILED DESCRIPTION OF THE PREFERRED EMBODIMENT

FIG. 1 illustrates removable fixtures providing electrical interfaces according to the preferred embodiments of the invention. Two such fixtures 11 are illustrated mounted on two adjacent modular wall units 13. The wall units 13 may be of any preferred size and are not shown to scale.

The wall units 13 have a rigid frame 15 surrounding the perimeter of a compressible panel 17. These compressible panels 17 may be sound absorptive glass fiber pads constructed as disclosed in the aforementioned U.S. Pat. No. 3,934,382 to Gartung, which is incorporated by reference herein.

An electrical interface fixture 11 of the preferred embodiment is shown in greater detail in FIGS. 2 through 5. As there illustrated, the fixture 11 comprises two separate components, a molding 19 and a socket bearing panel 21. The molding 19 and socket bearing panel 21 interlock to form a cooperating assembly as illustrated in FIG. 2. The molding 19 may carry and conceal cables such as telephone cables.

The molding 19 is constructed of a pair of L-shaped metal members 23, 25 jointed together to form a U-shaped channel. This channel is closed by a U-shaped capping member 27. The capping member 27 is composed of a first U-shaped member 31 disposed within a second U-shaped member 29. The first U-shaped member 31 is of a width small enough to leave a slight gap 33 on either side between the first and second U-shaped members 29, 31. These gaps 33 permit the capping member 27 to be tightly pressfitted onto the U-shaped channel.

The molding 19 is fitted with a mounting plate 35 bearing mounting tabs 38. This plate 35 is attached to the side of one of the L-shaped members 23 of the molding 19 by means of a spacer plate 37. The spacer plate 37 spaces the mounting plate slightly away from the side of the adjacent L-shaped member 23.

The socket bearing panel 21 is composed of a socket bearing channel 39 and a channel mounting plate 41. Suitable mounting tabs 49 are attached at each end of the back surface of the channel mounting plate 41.

The socket bearing channel 39 is rectangular in shape and bears an arbitrary number of electrical sockets 43. At one end of the socket bearing channel 39, a connector block 44 is provided for attaching the conductors emanating from the electrical sockets 43 to an external plug 47. Other apparatus for interfacing with electrical equipment could be provided in the socket bearing channel according to the invention.

To install the electrical fixture 11 in a wall unit 13, the socket bearing panel 21 is first mounted by inserting the tabs 49 and the lower edge 51 of the channel mounting plate 41 into the space between the compressible panel 17 and the rigid frame 13. This mounting is accomplished by placing the mounting plate 41 along a diagonal of a wall unit 13 (FIG. 6) and then pressing the tabs 49 and edge 51 into place while sliding the mounting plate into final position parallel to the bottom edge of the wall unit 13. The resilient nature of the compressible panel 17 facilitates mounting and retaining the socket bearing plate 21.

Once the socket bearing panel 21 is installed, the molding 19 may be similarly mounted by placing it diagonally to enable insertion of the tabs 38 between the rigid frame 15 and compressible material 17 of the wall unit 13. The upper edge 42 of the channel mounting plate 41 interlocks with the gap created in the molding 19 by the spacer plate 37, as illustrated in FIG. 2.

To remove the fixture 11, an inverse procedure to the one just described is used. The molding 19 and the socket bearing panel 21 are successively slid to a diagonal position to disengage their respective mounting tabs 38, 49. Thus, the insertion and removal of the electrical socket mounting assemblies 11, is accomplished without damaging or altering the wall panels 13. Flexibility in configuration and reconfiguration of spaces partitioned by such panels is thereby facilitated. In addition, the molding member 19 supplements the aesthetically pleasing appearance of the wall units 13.

As shown in FIG. 1, several fixtures 11 may be provided on adjacent wall panel sections 13 and may be simply connected together by means of the plug 47. Various modifications in this cooperating structure are apparent. For example, the moldings 19 could extend across the rigid vertical frame members 15 to give the appearance of a continuous assembly. Similarly, the socket bearing channels 39 could be extended to meet one another. These channels 39 could also easily be provided with respective male and female connectors mounted interiorly such that adjacent socket bearing channels 39 could be effectively plugged together while still maintaining a continuous appearance. Such modifications are easily within the purview of one of ordinary skill in the art. In addition, various methods and materials such as plastic could be used for forming the moldings 19 and socket bearing panels 21. Many other modifications are possible without departing from the scope and spirit of the invention. It is therefore to be understood that, within the scope of the appended claims, the invention may be practiced otherwise than as specifically described above.

What is claimed is:

1. In a reconfigurable modular sound-absorbing office screen system having a plurality of hollow rigid square frame members with vertical side support members and interconnecting horizontal support members and a central sound absorbing panel of resilient material mounted in and supported on all four peripheral sides of the rigid frame member, the frame member capable of being interconnected to other frame members to form a predetermined wall partition configuration independent of the structural support walls of an office building, the improvement comprising;
   an elongated channel housing member of approximately the same length as the horizontal interior distance between the respective side support members of the rigid frame member having a front surface supporting a plurality of electrical terminal receptacles and a rear surface of an approximately planar configuration;
   mounting tab means attached to at least the respective ends of the elongated channel housing member adjacent the rear planar surface and extending beyond the channel housing, the combined length of the mounting tab means and the channel housing member being greater than the horizontal interior distance between the side support members but less than the diagonal distance across the sound absorbing panel, the mounting tab means being removably inserted between the resilient sound absorbing panel and the frame side support members by diagonally positioning the channel housing member relative to the frame member and depressing the resilient panel, while sliding the upper end downward to operatively position the channel housing member parallel to and above the lower horizontal support member of the frame member, and
   means for electrically interconnecting respective adjacent channel housing members.

2. The invention of claim 1 further including;
   a hollow molding member;
   mounting means on the hollow molding member for insertion between the elongated channel housing member and the resilient sound absorbing panel, and
   second mounting tab means attached to the respective ends of the molding member, the combined length of the second mounting tab means and the molding member being greater than the horizontal interior distance between the side support members but less than the diagonal distance across the sound absorbing panel, the second mounting tab means being removably inserted between the sound absorbing panel and the frame side support members by diagonally positioning the molding member relative to the frame member and depressing the resilient panel while sliding the upper end downward to operatively position the molding member parallel to and above the elongated channel housing member.

3. The invention of claim 2 wherein the molding member includes, a lower housing member and an upper housing member joined together, the lower housing member including a pair of L-shaped members joined together to form a U-shaped channel and the upper housing member including a pair of U-shaped members nestled together.

4. In a reconfigurable modular sound absorbing office screen system having a plurality of hollow rigid square frame members with vertical side support members and interconnecting horizontal support members and a central sound absorbing panel of resilient fiberglass material mounted in and supported on all four peripheral sides of the rigid frame member, the frame member capable of being interconnected to other frame members to form a predetermined wall partition configuration independent of the structural support walls of an office building, the improvement consisting of;
  a hollow molding member;
  mounting means on the hollow molding member for insertion between the elongated channel housing member and the resilient sound absorbing panel, and
  mounting tab means attached to the respective ends of the molding member, the combined length of the mounting tab means and the molding member being greater than the horizontal interior distance between the side support members but less than the diagonal distance across the sound absorbing panel, the mounting tab means being removably inserted between the sound absorbing panel and the frame side support members by diagonally positioning the molding member relative to the frame member and depressing the resilent panel while sliding the upper end downward to operatively position the molding member parallel to and above the elongated channel housing member.

5. The invention of claim 4 wherein the molding member includes a lower housing member and an upper housing member joined together, the lower housing member including a pair of L-shaped members joined together to form a U-shaped channel and the upper housing member including a pair of U-shaped members nestled together.

6. The invention of claim 5 wherein the U-shaped members include a dimensionally smaller interior U-shaped member compared to the exterior U-shaped member to thereby form a pair of elongated parallel slots for removably receiving the respective upper edges of the L-shaped members.

7. In a reconfigurable modular sound absorbing office screen system having a plurality of hollow rigid square frame members with vertical side support members and interconnecting horizontal support members and a central sound absorbing panel of resilient material mounted in and supported on all four peripheral sides of the rigid frame member, the frame member capable of being interconnected to other frame members to form a predetermined wall partition configuration independent of the structural support walls of an office building, the improvement comprising;
  an elongated channel housing member of approximately the same length as the horizontal interior distance between the respective side support members of a rigid frame member having a front surface supporting a plurality of electrical terminal receptacles and a rear surface of an approximately planar configuration;
  mounting tab means attached to at least the respective ends of the elongated channel housing member adjacent the rear planar surface and extending beyond the channel housing, the combined length of the mounting tab means and the channel housing member being greater than the horizontal interior distance between the side support members but less than the diagonal distance across the sound absorbing panel, the mounting tab means being removably inserted between the sound absorbing panel and the frame side support members by diagonally positioning the channel housing member relative to the frame member and depressing the resilient panel, while sliding the upper end downward to operatively position the channel housing member parallel to and above the lower horizontal support member of the frame member;
  means for electrically interconnecting respective adjacent channel housing members;
  a hollow molding member for supporting cables such as telephone lines having an upper and lower housing member joined together, the lower housing member including a pair of L-shaped members joined together to form a U-shaped channel to receive the cables and the upper housing member including a pair of U-shaped members attached together to form elongated slots for receiving a respective upper edge of each L-shaped member, and
  means for attaching the hollow molding member to the rigid frame.

8. The invention of claim 7 wherein the means for attaching the hollow molding member includes a respective tab member extending from each end of the molding member adjacent its rear surface and positioned between the resilient sound absorbing panel and the side support members of the frame.

* * * * *